Patented May 21, 1935

2,002,280

UNITED STATES PATENT OFFICE 2,002,280

AMINO ANTHYRIDINES AND PROCESS OF MAKING SAME

Walter Schoeller, Berlin-Westend, and Otto von Schickh, Berlin, Germany, assignors to Schering-Kahlbaum A. G., Berlin, Germany No Drawing. Application April 30, 1932, Serial No. 608,558. In Germany May 13, 1931

9 Claims. (Cl. 260—40)

Our invention refers to condensation products from 2,6-diamino pyridine and its acylated substitution products.

We have found that if 2,6-diamino pyridine or one of its acylated substitution products is acted upon with an aldehyde and formic acid, dyestuffs are obtained, which owing to their bactericidal properties form valuable pharmaceutical products.

We assume the relation to occur in such manner that from the substituted dipyridyl methanes, which are formed in the reaction, ammonia is split off and new compounds result, which we call anthyridines, as shown by the following formulae:

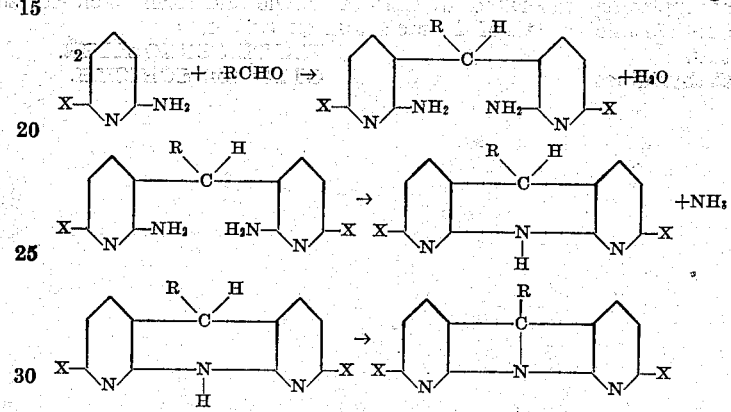

In these formulae X is an alkylated or non-alkylated amino group, while R is an alkyl group or hydrogen.

The final products of reaction are yellow colored substances of vigorously bactericidal properties.

In practising our invention, we may for instance proceed as follows:—

Example 1

120 parts by weight 2,6-diamino pyridine and 640 parts formic acid (80%) are dissolved in 1300 parts hot formaldehyde (35%) and boiled during 12 hours under the reflux condenser. The formaldehyde in excess is expelled by distillation with steam and the solution is then concentrated by evaporation and the final product precipitated by adding hydrochloric acid. By repeated recrystallization from alcohol the pure product is obtained. It is yellow colored and decomposes without melting at 250° C. In cold and better still in warm water and in alcohol the product dissolves, the solution showing a magnificent green fluorescence.

Example 2

If the 2,6-diamino pyridine recited in Example 1 is replaced by 156 parts monoacetyl-2,6-diamino pyridine, the formaldehyde by 1900 parts of a corresponding solution of acetaldehyde, the mixture being treated as described with reference to Example 1, a compound is obtained which displays analogous properties as the product obtained in accordance with Example 1.

Various changes may be made in the details disclosed in the foregoing specification without departing from the invention or sacrificing the advantages thereof.

We claim:—

1. The compounds being constituted according to the formula

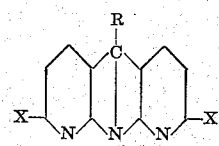

wherein X is an acylated or non-acylated amino group, while R is an alkyl group or hydrogen, these products being yellow coloured, having vigorously bactericidal properties and dissolving in cold and better still in warm water with magnificent green fluorescence.

2. The compounds being constituted according to the formula

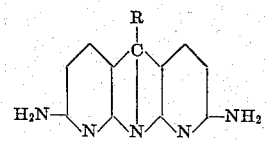

wherein R is an alkyl group, the products being yellow colored, having vigorously bactericidal properties and dissolving in cold and better still in warm water with magnificent green fluorescence.

3. The condensation product from two molecules of diamino pyridine and one molecule of formaldehyde, this product being probably constituted according to the formula

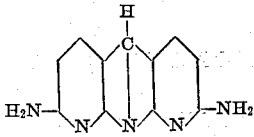

the product being yellow colored, having vigorously bactericidal properties and dissolving in cold and better still in warm water with magnificent green fluorescence.

4. The condensation product from two molecules of diamino pyridine and one molecule of acetaldehyde, this product being probably constituted according to the formula

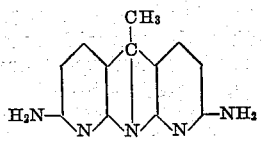

the product being yellow colored, having vigorously bactericidal properties and dissolving in cold and better still in warm water with magnificent green fluorescence.

5. The method of producing amino anthyridines comprising heating acylated 2,6-diaminopyridine with a saturated aliphatic aldehyde and formic acid in excess of the molecular quantities.

6. The method of producing amino anthyridines comprising heating a 2,6-diaminopyridine product having the formula

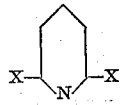

wherein X is an acylated or non-acylated amino group with a saturated aliphatic aldehyde and formic acid in excess of the molecular quantities.

7. The method of producing amino anthyridines comprising heating a 2,6-diaminopyridine product having the formula

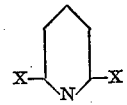

wherein X is an acylated or non-acylated amino group with formaldehyde and formic acid in excess of the molecular quantities.

8. The method of producing amino anthyridines comprising heating a 2,6-diaminopyridine product having the formula

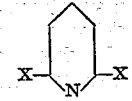

wherein X is an acylated or non-acylated amino group with acetaldehyde and formic acid in excess of the molecular quantities.

9. The method of producing amino anthyridines comprising heating 2,6-diaminopyridine with a saturated aliphatic aldehyde and formic acid in excess of the molecular quantities.

WALTER SCHOELLER.
OTTO von SCHICKH.